Nov. 20, 1923
A. E. BILLGER
1,474,925
PNEUMATIC BELL RINGER
Filed Jan. 31, 1921
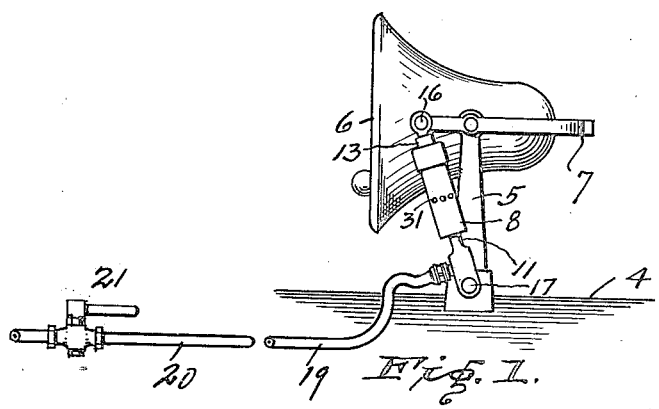
Fig. 1.
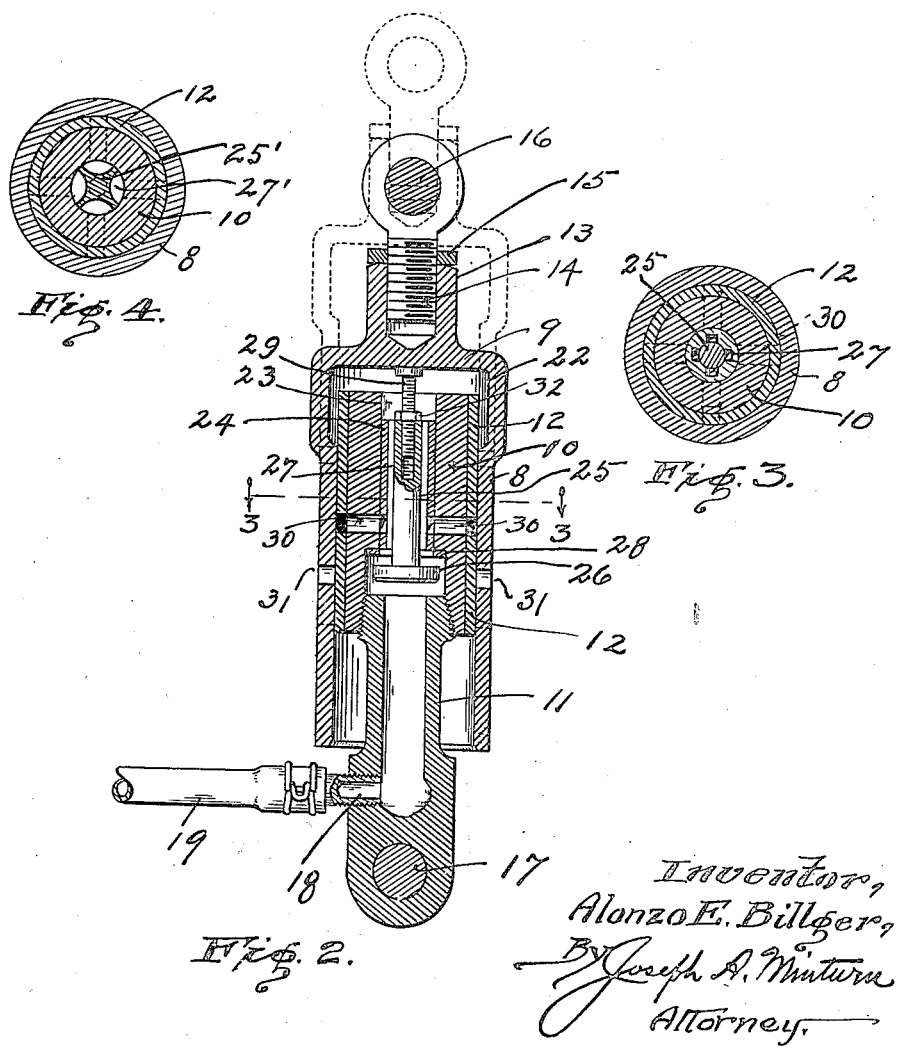
Fig. 4.
Fig. 3.
Fig. 2.
Inventor,
Alonzo E. Billger,
By Joseph A. Minturn
Attorney.

Patented Nov. 20, 1923.

1,474,925

UNITED STATES PATENT OFFICE.

ALONZO E. BILLGER, OF INDIANAPOLIS, INDIANA.

PNEUMATIC BELL RINGER.

Application filed January 31, 1921. Serial No. 441,208.

*To all whom it may concern:*

Be it known that I, ALONZO E. BILLGER, a citizen of the United States, residing at Indianapolis, in the county of Marion and State of Indiana, have invented new and useful Improvements in Pneumatic Bell Ringers, of which the following is a specification.

The object of this invention is to provide a bell-ringer for locomotive engines that will operate automatically by compressed air, and in which the supply of air may be readily regulated to utilize its maximum expansive force and at the same time to keep the apparatus from turning the bell quite over.

The object also is to provide a removable bearing sleeve between the cylinder and its plunger whereby looseness due to wear may be corrected by substituting a suitable new sleeve.

A further object is to provide an apparatus that will be inexpensive to construct, easy of application without the assistance of trained mechanics, and that will be neat in appearance and durable.

I accomplish the above objects, and other objects which will hereinafter appear, by the mechanism illustrated in the accompanying drawing, in which like characters of reference indicate like parts, and in which—

Fig. 1 is a view in side elevation of a locomotive engine bell and stand with my invention operatively applied for ringing the bell. Fig. 2 is a longitudinal central section of my invention, and Fig. 3 is a cross section of the device shown in Fig. 2, taken on the line 3—3 of Fig. 2. Fig. 4 is a section showing a modified valve stem.

Mounted on the boiler 4 of the locomotive is the standard 5, on which the bell 6 is mounted. The bell has an arm 7 to which the rope is attached for manually ringing the bell, and to which my automatic ringer is applied. All of the above designated parts are of usual and well known construction.

My apparatus comprises primarily a cylinder pivotally attached to the arm 7, a piston or plunger reciprocating in the cylinder by the expansion of compressed air and attached pivotally to the base of the standard 5, and means to regulate the supply of compressed air to the cylinder.

The cylinder 8 has one end 9, closed. The other end is open for the insertion of plunger 10 and for the passage from the cylinder of the plunger-rod 11. The bore of the cylinder is ample to receive the plunger with a bearing sleeve 12 around it. The sleeve is preferably in two parts divided opposite port 30 and, the purpose of said sleeves is to take the wear off of the plunger and to provide a simple and quick means for compensating for the wear on the cylinder by removing the worn sleeves and substituting larger ones of the right diameter. An enlargement of the bore of the cylinder next to its headed end provides an expansion chamber, and formed outside integral with the head is a boss 13 with a screw threaded bore in which an eyebolt 14 is adjustably screwed, a given adjustment being held by a locknut 15. The eye of the bolt receives a pin 16, on the arm 7.

The lower end of the plunger-rod 11 has a hole receiving a pin 17, seated in the base of the standard 5. The upper and major portion of the plunger-rod 11 is hollow. This hollow portion is entered by a nipple 18, to which a flexible hose 19 is connected. The hose joins a suitable pipe 20 leading from a suitable compressed-air supply,— generally back in the engineer's cab. The pipe 20 has a valve 21 by which a supply of compressed air is turned on or off at the will of the operator.

Formed in the plunger at the end of the rod 11 is a chamber 22, into which the hollow portion of the rod discharges, and extending longitudinally of the plunger from said chamber 22 to the opposite end of the plunger is a reduced bore 23, in which a hollow sleeve 24 is seated. In the bore of the sleeve 24 is the stem 25 of a valve 26. Formed around the stem in the sleeve 24 are a number of air-ports 27, here shown as four in number—see Fig. 3, which are closed by the valve 26 when the latter is seated against the shoulder in the plunger formed by the reduced diameter of the bore 23. A bearing ring 28 may be introduced as a seat for the valve. In the stem 25 is a threaded hole in which a set screw 29 is seated. The extent of projection of the screw beyond the end of the valve stem determines the time of the opening of the valve. The opening of the valve is caused by contact of the stem with the closed end of the cylinder when the plunger has approached near enough to said end in its upward travel.

Formed in the plunger 10 and sleeve 12 are a series of radial ports 30, which communicate at all times with the ports 27, but are closed to atmosphere by the walls of the cylinder 8 except in part of the lower half of the travel of the plunger where they communicate with ports 31 of the cylinder and discharge to atmosphere.

The plunger-rod 11 is preferably screwed into the plunger to facilitate the assembly of valve 26, and the set screw 29 is held in a given position by a lock nut 32.

The operation of my invention is as follows: When the engineer or fireman desires to ring the bell he opens valve 21, thereby admitting compressed air to the hollow plunger-rod 11. With the valve 26 open as shown, the air will pass through ports 27 to the expansion chamber 22, and so raise the cylinder 8 as to release the set-screw 29, whereupon the air pressure against the lower side of valve 26 will close the valve. The further expansion of the air already admitted to the chamber 22 will continue to raise the cylinder bringing its port 31 into open communication with port 30. Valve 26 is kept on seat 28 by air pressure when head 9 clears off screw 29. The bell has then swung to the position shown in Fig. 1 by the lengthening of the parts comprised of the members 8 and 11, and when the air pressure is thus removed the weight of the bell causes the latter to oscillate in the opposite direction. When it has swung sufficiently past its vertical axis the contact of screw 29 against the head of the cylinder again opens valve 26. The above described operation is repeated swinging the bell to the other side of its standard until the ports 30 and 31 release the pressure by discharging the air to atmosphere. This oscillation will continue until the compressed air is shut off by closing the valve 21.

The arc of vibration is controlled by adjusting bolt 14 and set screw 29.

After the supply of air has been cut off from the cylinder its continued expansion accelerates the upward swing of the bell until the pressure in the cylinder is counterbalanced by the atmospheric pressure on the outside. Then the movement of the bell is checked before it turns clear over. This is an important feature of my invention in that it effectually prevents the turning over of the bell, which is such an objectionable feature in the operation of many pneumatic bell ringers.

Still another advantage, in the durability of my device, obtains from the pivoting of the entire unit at one end whereby the cylinder and plunger rod both swing together, thereby avoiding unequal side wear between the plunger and cylinder as results from those devices having a relatively fixed cylinder and a plunger rod pivoted to the plunger.

In the modified form shown in Fig. 4, the sleeve 24 is omitted and the bore 23 is occupied by the valve stem 25' which has longitudinal ports 27' formed in it. For economy of construction this is a preferred form.

While I have here shown the best embodiment of my invention now known to me, it is obviously susceptible of variations and I therefore do not desire to be limited unduly or any more than is pointed out in the claims, but what I desire to secure by Letters Patent, is:—

1. The combination with a bell oscillatively mounted and having an arm to swing it by, of a relatively fixed pivot, and means connecting the pivot and arm, comprising a cylinder closed at one end, a plunger reciprocating therein, means for supplying an expansive agent between the plunger and closed end of the cylinder, means comprising a valve in the plunger for cutting off the expansive agent before the bell has reached the end of its arc of vibration, means for releasing said agent to atmosphere at the end of said arc, and means to predetermine the degrees of said arc.

2. The combination with a bell oscillatively mounted and having an arm to swing it by, of a relatively fixed pivot, and means connecting the pivot and arm comprising a cylinder element, a plunger element reciprocating therein, means for supplying an expansive agent between the plunger and a closed end of the cylinder elements comprising a valve in the plunger opened by contact with the opposing one of said elements, and adjustable means to predetermine the time of said valve opening.

3. The combination with a bell oscillatively mounted, and an arm to swing it by, of a relatively fixed pivot, means in a plurality of parts connecting the pivot and arm some of which parts are movable relative to the others to vary the length of the connecting means, means actuated by an expansive fluid to vary the length of said connecting means and cause the bell to travel in the arc of a circle, means to counterbalance the pressure of the expansive fluid by atmospheric pressure and reverse the travel of the bell, and adjustable means to predetermine the arc of vibration of the bell.

4. The combination with a bell oscillatively mounted, and an arm to swing it by, of a relatively fixed pivot, means in a plurality of parts connecting the pivot and arm some of which parts are movable relative to the others to vary the length of the connecting means, means actuated by an expansive fluid to vary the length of said connecting means and cause the bell to travel in the arc of a circle, means to counterbalance the pressure of the expansive fluid by atmospheric pressure and reverse the travel of the bell, and means to change the maximum length of the arm to predetermine the arc of vibration of the bell.

5. The combination with a bell oscillatively mounted, and an arm to swing it by, of a relatively fixed pivot, and means connecting the pivot and arm comprising a cylinder pivoted to the arm and having at least one closed end, said cylinder having exhaust ports, a hollow plunger pivoted to the fixed pivot and reciprocating in the cylinder, means for supplying an expansive fluid to the interior of the plunger and thence to the cylinder, a valve in the plunger to control the fluid flow therethrough, said plunger having exhaust ports which open into the ports of the cylinder at parts of the relative movement of the plunger and cylinder.

6. The combination with a bell oscillatively mounted, and an arm to swing it by, of a relatively fixed pivot, and means connecting the pivot and arm comprising a cylinder pivoted to the arm and having at least one closed end, said cylinder having exhaust ports, a hollow plunger pivoted to the fixed pivot and reciprocating in the cylinder and having a longitudinal opening and smaller ports communicating therewith and discharging into the cylinder, a valve adapted to close said ports and so much of the opening as is not otherwise closed, a valve stem passing through said opening to contact a head of the cylinder and open the valve at suitable relative positions of cylinder and plunger, the ports of the plunger opening into exhaust ports of the cylinder during portions of the relative movement of the plunger and cylinder.

7. The combination with a bell oscillatively mounted, and an arm to swing it by, of a relatively fixed pivot, and means connecting the pivot and arm comprising a cylinder with at least one closed end, said cylinder having exhaust ports, a plunger reciprocating in the cylinder having a longitudinal opening, a sleeve mounted in said opening and having a longitudinal bore with smaller ports communicating therewith and discharging into the cylinder, a valve within and constantly carried by the piston to close the ports and so much of the bore as is not otherwise closed, a valve stem passing out of the piston through the bore of the sleeve and adapted to contact a head of the cylinder to open the valve, means to vary the effective length of the stem to change the time of opening, the ports of the plunger opening into the exhaust ports of the cylinder at portions of the relative movement of the plunger and cylinder.

8. The combination with a bell oscillatively mounted, and an arm to swing it by, of a relatively fixed pivot, and means connecting the pivot and arm comprising a cylinder with a closed end and having exhaust ports through its side remote from said end, a hollow plunger reciprocating in the cylinder, a renewable sleeve secured to the plunger between it and the cylinder, means for supplying an expansive fluid to the hollow plunger and thence into the cylinder and automatically operated valve means in the plunger to control the fluid flow from the latter to the cylinder, said plunger and sleeve having exhaust ports opening to atmosphere through the ports of the cylinder at portions of the relative movement of plunger and cylinder.

Signed at Indianapolis, Indiana, this the 25 day of January, 1921.

ALONZO E. BILLGER.